United States Patent
Tseng

(10) Patent No.: US 9,504,083 B2
(45) Date of Patent: *Nov. 22, 2016

(54) METHOD AND RELATED COMMUNICATIONS DEVICE FOR IMPROVING DISCONTINUOUS RECEPTION FUNCTIONALITY

(75) Inventor: Li-Chih Tseng, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 1653 days.

This patent is subject to a terminal disclaimer.

(21) Appl. No.: 12/343,501

(22) Filed: Dec. 24, 2008

(65) Prior Publication Data

US 2009/0181670 A1    Jul. 16, 2009

Related U.S. Application Data

(60) Provisional application No. 61/020,152, filed on Jan. 10, 2008.

(51) Int. Cl.
*H04W 4/00* (2009.01)
*H04W 76/04* (2009.01)
*H04L 1/18* (2006.01)

(52) U.S. Cl.
CPC .......... *H04W 76/048* (2013.01); *H04L 1/1848* (2013.01)

(58) Field of Classification Search
USPC ....... 370/431, 252, 208, 311, 315, 343, 336, 370/347, 572.1; 455/435.1, 437, 458, 434, 455/422.1, 436, 501, 423, 67.11, 450, 507
See application file for complete search history.

(56) References Cited

U.S. PATENT DOCUMENTS

| | | | |
|---|---|---|---|
| 6,282,182 B1 * | 8/2001 | Pecen et al. | 370/336 |
| 2007/0254656 A1 * | 11/2007 | Dalsgaard | 455/435.1 |
| 2007/0291728 A1 * | 12/2007 | Dalsgaard et al. | 370/347 |
| 2008/0159323 A1 * | 7/2008 | Rinne et al. | 370/431 |
| 2008/0186892 A1 * | 8/2008 | Damnjanovic | 370/311 |
| 2008/0309490 A1 * | 12/2008 | Honkanen et al. | 340/572.1 |
| 2009/0147727 A1 * | 6/2009 | Tseng | 370/315 |
| 2009/0180414 A1 * | 7/2009 | Maeda et al. | 370/311 |

(Continued)

FOREIGN PATENT DOCUMENTS

KR    1020070097282 A    10/2007

OTHER PUBLICATIONS

3GPP TS 25.308 V7.4.0 (Sep. 2077), 3rd Generation Partnership Project; Technical Specification Group Radio Access Network; High Speed Downlink Packet Access (HSDPA); Overall description; Stage 2 (Release 7).*

(Continued)

*Primary Examiner* — Joseph Arevalo
(74) *Attorney, Agent, or Firm* — Blue Capital Law Firm, P.C.

(57) ABSTRACT

A method of improving discontinuous reception (DRX) functionality for a user equipment (UE) of a wireless communication system is disclosed, so as to allow continuous reception of following transmissions during a retransmission period. The method includes steps of monitoring a Physical Downlink Control Channel (PDCCH) when an On Duration Timer, a DRX Inactivity Timer or a DRX Retransmission Timer is running; and starting or restating the DRX Inactivity Timer when the PDCCH indicates the UE a new transmission.

8 Claims, 4 Drawing Sheets

(56) References Cited

U.S. PATENT DOCUMENTS

2010/0015984 A1* 1/2010 Kazmi .......................... 455/437
2010/0062795 A1* 3/2010 Lee ............................... 455/458
2010/0195524 A1* 8/2010 Iwamura et al. ............. 370/252
2011/0013506 A1* 1/2011 Ishii et al. .................... 370/208

OTHER PUBLICATIONS

IEEE Communications Letters, vol. 11, No. 1, Jan. 2007, Suckchel Yang, Student Member, IEEE, Myungsik Yoo, Member, IEEE, and Yoan Shin, Member, IEEE, Adaptive Discontinuous Reception Mechanism for Power Saving in UMTS.*

3GPP TS 36.321 V8.0.0(Dec. 2007) 3rd Generation Partnership Project; Technical Specification Group Radio Access Network; Evolved Universal Terrestrial Radio Access (E-UTRA) Medium Access Control (MAC) protocol specification (Release 8).*
3GPP, 3GPP R2-080021, "Stage 3 Description of DRX", Jan. 2008.
Anonymous : "3GPP TS 36.321 V8.0.0- 3rd Generation Partnership Project; Technical Specification Group Radio Access Network; Evolved Universal Terrestrial Radio Access (E-UTRA) Medium Access Control (MAC) protocol specification (Release 8)" , Dec. 2007, pp. 1-23, XP002520880.
Ericsson : "DRX and DTX in LTE_Active" , 3GPP TSG-RAN WG2 Meeting #52, Tdoc R2-060967, Mar. 27-31, 2006, pp. 1-5, XP002463498.

* cited by examiner

METHOD AND RELATED COMMUNICATIONS DEVICE FOR IMPROVING DISCONTINUOUS RECEPTION FUNCTIONALITY

CROSS REFERENCE TO RELATED APPLICATIONS

This application claims the benefit of U.S. Provisional Application No. 61/020,152, filed on Jan. 10, 2008 and entitled "Method and Apparatus for Enhancing DRX operation during the period of retransmission", the contents of which are incorporated herein by reference.

BACKGROUND OF THE INVENTION

1. Field of the Invention

The present invention relates to a method and related communications device for improving discontinuous reception (DRX) functionality in a wireless communications system, and more particularly, to a method and related communications device for improving start mechanism of a DRX Inactivity Timer of the DRX functionality in a wireless communications system.

2. Description of the Prior Art

The third generation mobile telecommunications system (called 3G system) provides high frequency spectrum utilization, universal coverage, and high quality, high-speed multimedia data transmission, and also meets all kinds of QoS requirements simultaneously, providing diverse, flexible, two-way transmission services and better communication quality to reduce transmission interruption rates.

Long Term Evolution wireless communications system (LTE system), an advanced high-speed wireless communications system established upon the 3G mobile telecommunications system, supports only packet-switched transmission, and tends to implement both Medium Access Control (MAC) layer and Radio Link Control (RLC) layer in one single communication site, such as in Node B alone rather than in Node B and RNC (Radio Network Controller) respectively, so that the system structure becomes simple.

Targeting on the present LTE system, Discontinuous Reception (DRX) functionality is applied to the MAC layer for allowing a user equipment (UE) to enter a standby mode during certain periods of time and stopping monitoring a Physical down Link Control Channel (PDCCH), so as to reduce power consumption of the UE.

In cases of using the DRX functionality, whenever a new DRX cycle begins, an On Duration Timer is started for awaking the UE to monitor the PDCCH until the On Duration Timer expires. In addition, when a DRX Inactivity Timer or a DRX Retransmission Timer is started, the UE also monitors the PDCCH.

During the time when the UE monitors the PDCCH, if the PDCCH indicates the UE to receive a packet on a Downlink Share Channel (DL-SCH) but the packet cannot be decoded successfully, the MAC layer of the UE would perform a Hybrid Automatic Repeat Request (HARQ) process to request a retransmission of the packet. Since the UE would not receive any retransmission packets during a round trip time of the HARQ process, a HARQ RTT Timer is thus configured by the DRX functionality for allowing the UE to go back to monitor the PDCCH after this period of time where the UE enters the standby mode, so that the power consumption of the UE can further be reduced.

When the HARQ RTT Timer expires, the DRX Retransmission Timer is started by the DRX functionality for providing the UE a certain amount of time to monitor the PDCCH for detecting retransmission packets of the HARQ process. If any retransmission packet of the HARQ process is detected, the DRX Retransmission Timer is stopped. Otherwise, the DRX Retransmission Timer is kept running until expiring.

On the other hand, when the On Duration Timer or the DRX Inactivity Timer is started, if the PDCCH indicates the UE to receive a new transmission packet, the DRX Inactivity Timer is then started or restarted for allowing the UE to continue monitoring the PDCCH, so as to prevent missing reception of following transmissions.

However, according to the above operation, when the DRX Retransmission Timer is running but both of the On Duration Timer and the DRX Inactivity Timer are not running, if the PDCCH indicates the UE to receive a new transmission packet, the DRX Inactivity Timer would not be started or restarted by the DRX functionality. In such a case, the UE may miss reception of the following new transmission packets due to inability of continuously mentoring the PDCCH.

SUMMARY OF THE INVENTION

It is therefore an objective of the present invention to provide a method of improving discontinuous reception (DRX) functionality for a user equipment of a wireless communications system, so as to prevent missing reception of the following transmissions.

According to the present invention, a method of improving discontinuous reception (DRX) functionality for an user equipment (UE) of a wireless communication system is disclosed. The method includes steps of monitoring a Physical Downlink Control Channel (PDCCH) when an On Duration Timer, a DRX Inactivity Timer or a DRX Retransmission Timer is running; and starting or restarting the DRX Inactivity Timer when the PDCCH indicates the UE a new transmission.

According to the present invention, a communications device of a wireless communication system for a user equipment (UE) improving discontinuous reception (DRX) functionality is disclosed. The communications device includes a processor for executing a process, and a storage device, coupled to the processor, for storing a program for executing the process. The process includes steps of monitoring a Physical Downlink Control Channel (PDCCH) when an On Duration Timer, a DRX Inactivity Timer or a DRX Retransmission Timer is running; and starting or restarting the DRX Inactivity Timer when the PDCCH indicates the UE a new transmission.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
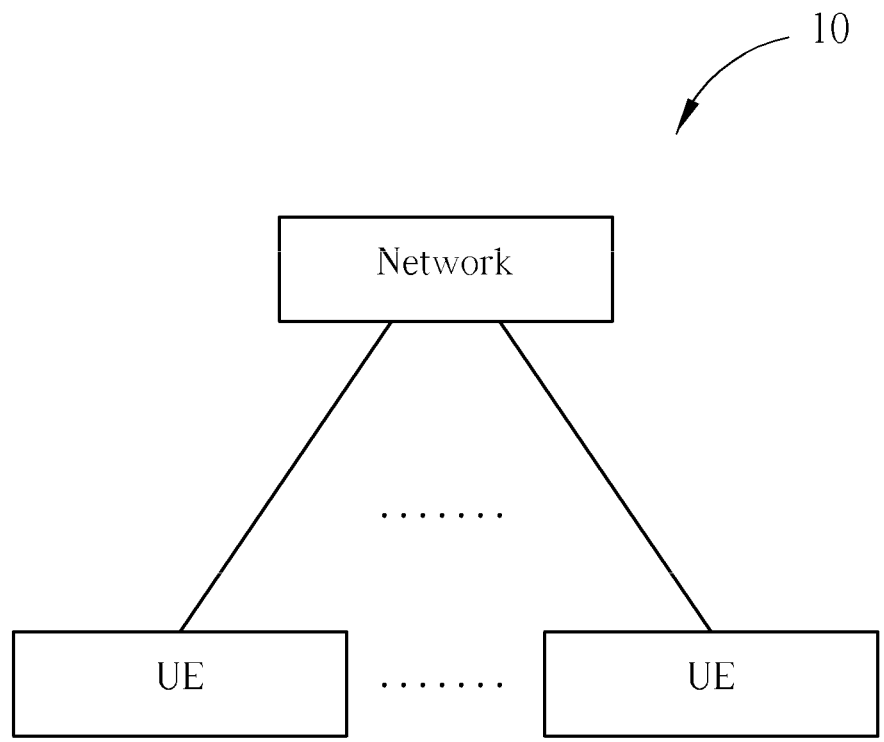
FIG. 1 is a schematic diagram of a wireless communication system.

Please refer to FIG. 1, which is a schematic diagram of a wireless communications system 10. The wireless communications system 10 is preferred to be a Long Term Evolution (LTE) communications system, and is briefly formed with a network terminal and a plurality of user equipments. In FIG. 1, the network terminal and the user equipments are simply utilized for illustrating the structure of the wireless communications system 10. Practically, the network terminal may include a plurality of evolved base stations (eNBs), an evolved UMTS radio access network (EUTRAN) and so on according to actual demands, and the user equipments (UEs) can be apparatuses such as mobile phones, computer systems, etc.

Figure 2:
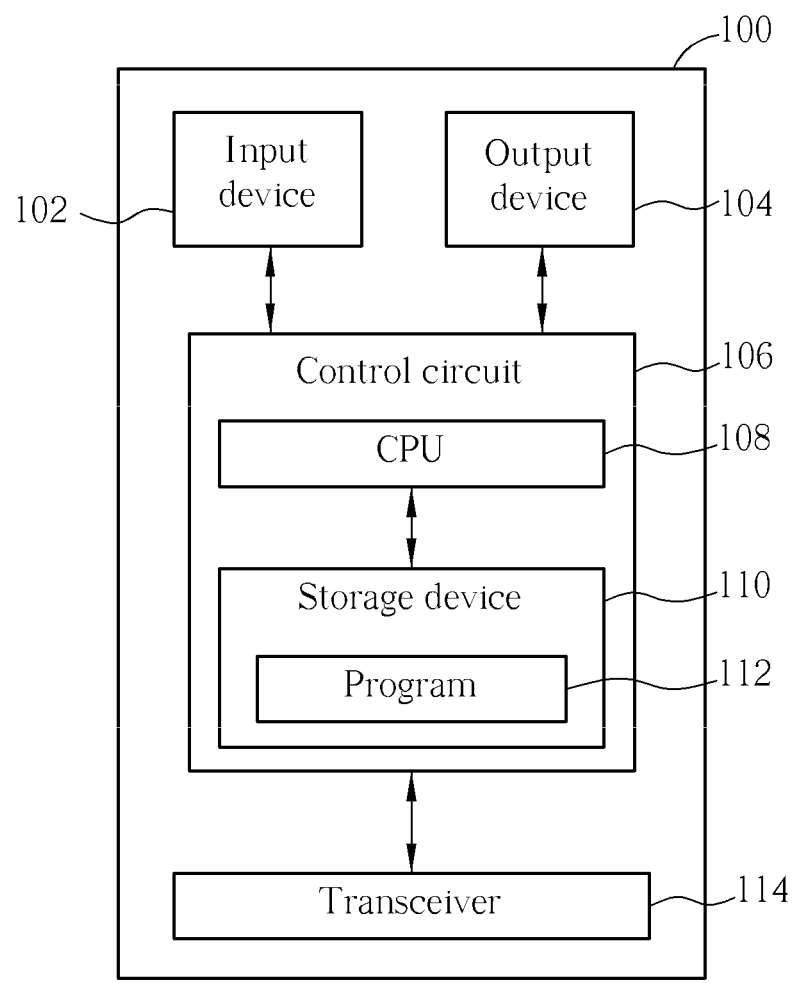
FIG. 2 is a functional block diagram of a wireless communication device.

Please refer to FIG. 2, which is a functional block diagram of a communications device 100. The communications device 100 can be utilized for realizing the UEs in FIG. 1. For the sake of brevity, FIG. 2 only shows an input device 102, an output device 104, a control circuit 106, a central processing unit (CPU) 108, a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
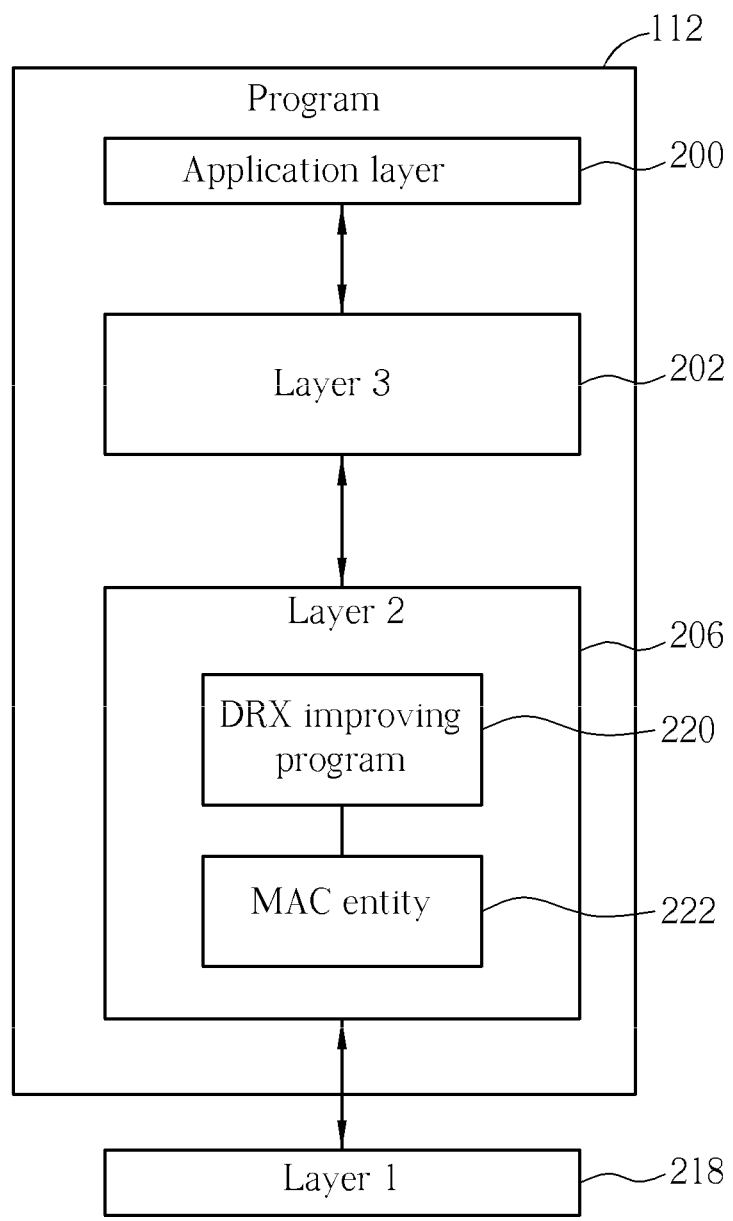
FIG. 3 is a schematic diagram of the program shown in FIG. 2.

Please continue to refer to FIG. 3. FIG. 3 is a schematic diagram of the program 112 shown in FIG. 2. The program 112 includes an application layer 200, a Layer 3 202, and a Layer 2 206, and is coupled to a Layer 1 208. The Layer 2 206 includes a media access control (MAC) entity 222 capable of simultaneously performing multiple Hybrid Automatic Repeat Request (HARQ) processes with a evolved Node-B (eNB) for packet reception and supporting discontinuous reception (DRX) functionality. When the DRX functionality is executed by the MAC entity 222 according to Radio Resource Control (RRC) commands of the Layer 3 202, a DRX improving program 220 is provided for the program 112 to allow continuous reception of following transmissions during a retransmission period according to an embodiment of the present invention.

Figure 4:
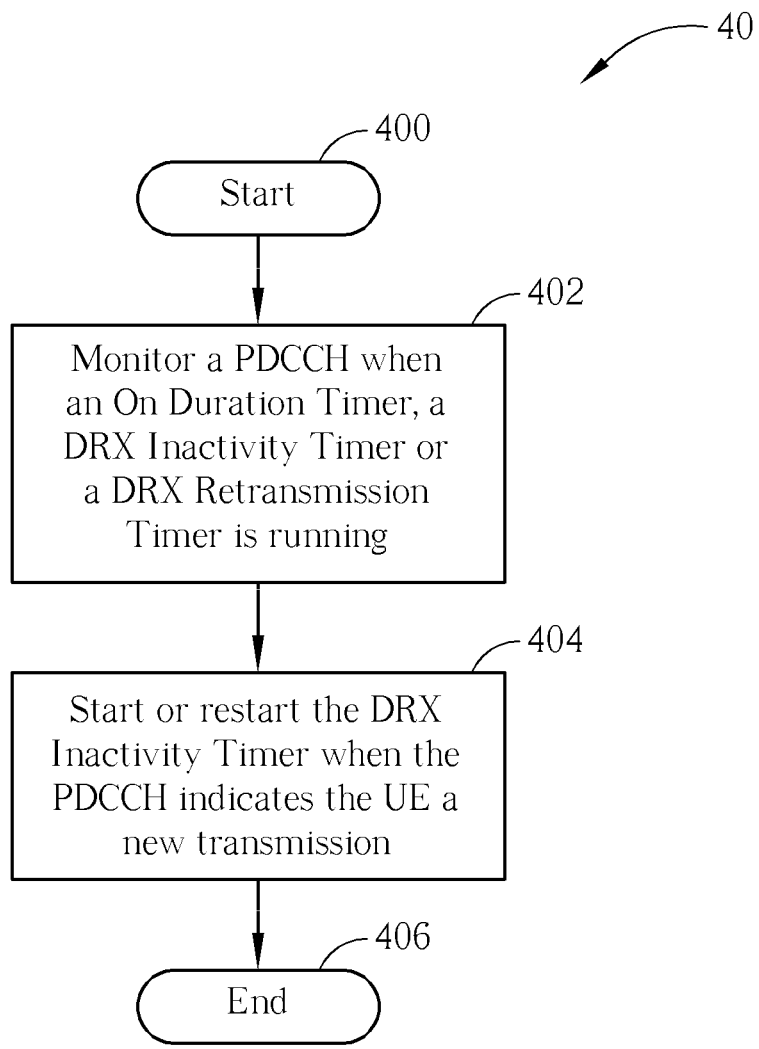
FIG. 4 is a flow chart of a process according to an embodiment of the present invention.

Please refer to FIG. 4, which is a flow chart of a process 40 according to an embodiment of the present invention. The process 40 is used for improving DRX functionality for a UE of a wireless communication system and can be compiled into the DRX improving program 220. The process 40 includes the following steps:

Step 400: Start.

Step 402: Monitor a Physical Downlink Control Channel (PDCCH) when an On Duration Timer, a DRX Inactivity Timer or a DRX Retransmission Timer is running.

Step 404: Start or restart the DRX Inactivity Timer when the PDCCH indicates the UE a new transmission.

Step 406: End.

According to the process 40, the UE using the DRX functionality monitors the PDCCH when the On Duration Timer, the DRX Inactivity Timer or the DRX Retransmission Timer is running. In such a situation, if the PDCCH indicates the UE a new transmission, the DRX Inactivity Timer is then started or restarted.

Thus, compared to the prior art, when the DRX Retransmission Timer is running but both of the On Duration Timer and the DRX Inactivity Timer are not running, if the PDCCH indicates the UE a new transmission, the DRX Inactivity Timer would be started or restarted to allow the UE to monitor the PDCCH continuously, so as to prevent missing reception of the following transmission packets.

Certainly, steps of realizing the DRX functionality can also be included in the process 40, and are not limited herein. For example, in the embodiment of the present invention, a Hybrid Automatic Repeat Request Round Trip Time Timer (HARQ RTT Timer) is started by the UE to wait for a retransmission of a corresponding HARQ process whenever the transmission is decoded unsuccessfully by the UE. Afterwards, when the HARQ RTT Timer expires, the DRX Retransmission Timer is then started to monitor the PDCCH for detecting the retransmission of the HARQ process.

Moreover, if any retransmission of the HARQ process is detected by the UE, the DRX retransmission timer is then stopped. Otherwise, the DRX Retransmission Timer is kept running until expiring. It is note that detailed descriptions of the DRX functionality irrelevant to the present invention are not given herein.

As mentioned above, the embodiment of the present invention improves start mechanism of the DRX Inactivity Timer of the DRX functionality, so as to prevent the UE from missing reception of the following new transmission packets due to inability of continuously mentoring the PDCCH.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving discontinuous reception (DRX) functionality for a user equipment (UE) of a wireless communication system, the method comprising:

monitoring a Physical Downlink Control Channel (PDCCH);

starting or restarting the DRX Inactivity Timer when the PDCCH indicates the UE a new transmission and DRX Retransmission Timer is running and both an On Duration Timer and a DRX Inactivity Timer are not running; and starting the DRX Retransmission Timer to monitor the PDCCH for detecting the retransmission of a Hybrid Automatic Repeat Request (HARQ) process when a HARQ Round-Trip Time (RTT) Timer expires.

2. The method of claim 1 further comprising: stopping the DRX retransmission timer when the retransmission of the HARQ process is detected.

3. The method of claim 1, wherein the wireless communication system is a Long Term Evolution (LTE) wireless communication system.

4. The method of claim 1, further comprising starting the HARQ RTT Timer to wait for a retransmission of the HARQ process whenever the new transmission is decoded unsuccessfully.

5. A communication device of a wireless communication system for a user equipment (UE) improving discontinuous reception (DRX) functionality, the communication device comprising:

a processor for executing a process; and
a storage device, coupled to the processor, for storing a program for executing the process, wherein the process comprises:
- monitoring a Physical Downlink Control Channel (PDCCH);
- starting or restarting the DRX Inactivity Timer when the PDCCH indicates the UE a new transmission and DRX Retransmission Timer is running and both an On Duration Timer and a DRX Inactivity Timer are not running; and
- starting the DRX Retransmission Timer to monitor the PDCCH for detecting the retransmission of a Hybrid Automatic Repeat Request (HARQ) process when a HARQ Round-Trip Time (RTT) Timer expires.

6. The communication device of claim 5, wherein the process further comprises: stopping the DRX retransmission timer when the retransmission of the HARQ process is detected.

7. The communication device of claim 5, wherein the wireless communication system is a Long Term Evolution (LTE) wireless communication system.

8. The communication device of claim 5, wherein the process further comprises starting the HARQ RTT Timer to wait for a retransmission of the HARQ process whenever the new transmission is decoded unsuccessfully.

* * * * *